(12) United States Patent
Huck et al.

(10) Patent No.: US 11,807,280 B2
(45) Date of Patent: Nov. 7, 2023

(54) COMPOSITE INSULATED BOXCAR FLOOR

(71) Applicant: TrinityRail Products and Services, LLC, Dallas, TX (US)

(72) Inventors: Kenneth W. Huck, Fairview, TX (US); Marco A. Morales, Flower Mound, TX (US); Ricky A. Cribbs, Ovilla, TX (US); Codrington E. Barzey, Melbourne, FL (US); Scott M. Lewit, Indialantic, FL (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 299 days.

(21) Appl. No.: 17/097,225

(22) Filed: Nov. 13, 2020

(65) Prior Publication Data

US 2021/0146968 A1 May 20, 2021

Related U.S. Application Data

(60) Provisional application No. 62/935,874, filed on Nov. 15, 2019.

(51) Int. Cl.
| | | |
|---|---|---|
| *B61D 17/10* | (2006.01) | |
| *B61F 1/02* | (2006.01) | |
| *B61D 17/04* | (2006.01) | |
| *B61D 17/18* | (2006.01) | |

(52) U.S. Cl.
CPC ........... *B61D 17/10* (2013.01); *B61D 17/043* (2013.01); *B61D 17/18* (2013.01); *B61F 1/02* (2013.01)

(58) Field of Classification Search
CPC .... B61D 17/04; B61D 17/043; B61D 17/045; B61D 17/10; B61D 17/18; B61D 17/24; B61D 49/00; B61D 17/005; B61D 27/0027; B61F 1/00; B61F 1/02; B61F 1/12

See application file for complete search history.

(56) References Cited

U.S. PATENT DOCUMENTS

| | | | | |
|---|---|---|---|---|
| 929,630 | A * | 7/1909 | Rice | B61F 1/02 |
| | | | | 105/416 |
| 4,690,072 | A * | 9/1987 | Wille | B61D 17/00 |
| | | | | 105/418 |
| 5,802,984 | A * | 9/1998 | Thoman | B61D 3/04 |
| | | | | 105/423 |
| 6,941,875 | B2 * | 9/2005 | Norton | B61D 17/045 |
| | | | | 105/397 |
| 7,478,600 | B2 * | 1/2009 | Beers | B61D 27/0027 |
| | | | | 105/423 |
| 10,329,763 | B2 * | 6/2019 | McCloud | E02B 3/068 |

* cited by examiner

*Primary Examiner* — S. Joseph Morano
*Assistant Examiner* — Cheng Lin
(74) *Attorney, Agent, or Firm* — BAKER BOTTS L.L.P.

(57) ABSTRACT

A floor section for an insulated railcar includes a floor plate and a composite section coupled to the floor plate. The composite section includes a plurality of composite beams aligned parallel to one another. Each composite beam of the plurality of composite beams includes an inner core and an outer material surrounding the inner core. The inner core includes an insulating material and is configured to support the outer material. An upper surface of each composite beam of the plurality of composite beams, which extends along a length of the composite beam, is coupled to an underside of the floor plate.

14 Claims, 13 Drawing Sheets

COMPOSITE INSULATED BOXCAR FLOOR

RELATED APPLICATIONS

This application claims priority to U.S. Provisional Application Ser. No. 62/935,874 entitled "COMPOSITE INSULATED BOXCAR FLOOR," filed Nov. 15, 2019, the entire content of which is incorporated herein by reference.

TECHNICAL FIELD

This disclosure relates generally to railcars, and more particularly to a composite insulated floor for use in a boxcar.

BACKGROUND

Railway boxcars may include insulated floors to help maintain the interiors of the boxcars at desired temperatures. Insulated boxcars may be used in combination with refrigeration units to transport perishable goods via rail.

SUMMARY

According to an embodiment, a floor section for an insulated railcar includes a floor plate and a composite section coupled to the floor plate. The composite section includes a plurality of composite beams aligned parallel to one another. Each composite beam of the plurality of composite beams includes an inner core and an outer material surrounding the inner core. The inner core includes an insulating material and is configured to support the outer material. An upper surface of each composite beam of the plurality of composite beams, which extends along a length of the composite beam, is coupled to an underside of the floor plate.

According to another embodiment, an insulated railcar includes a primary floor section and an underframe. The primary floor section includes a floor plate and a composite section coupled to the floor plate. The composite section includes a plurality of composite beams. Each composite beam of the plurality of composite beams includes an inner core and an outer material surrounding the inner core. The inner core includes an insulating material and is configured to support the outer material. An upper surface of each composite beam of the plurality of composite beams, which extends along a length of the composite beam, is coupled to an underside of the floor plate. The underframe includes a center sill and a plurality of cross-bearers. The primary floor section is coupled to the underframe. Each composite beam of the plurality of composite beams is aligned generally parallel to each cross-bearer of the plurality of cross-bearers.

According to a further embodiment, a method for forming a primary floor section for an insulated railcar includes forming a plurality of composite beams. Each composite beam of the plurality of composite beams includes an inner core and an outer material surrounding the inner core. The inner core includes an insulating material and is configured to support the outer material. The method also includes forming a composite section from the plurality of composite beams. The composite section includes a top side and a bottom side opposite the top side. The composite beams are aligned parallel to one another within the composite section. The method additionally includes coupling a floor plate to the top side of the composite section.

Certain embodiments of the composite insulated boxcar floor may provide one or more technical advantages. For example, an embodiment may reduce the overall weight of the railcar, improving the efficiency of rail transport. As another example, an embodiment may provide a customizable floor, adaptable for use in both insulated and refrigerated boxcars. As a further example, an embodiment may reduce the stresses and deflections imposed on the structural components of a railcar as a result of differing coefficients of thermal expansion between the railcar underframe and the composite floor. Certain embodiments may include none, some, or all of the above technical advantages. One or more other technical advantages may be readily apparent to one skilled in the art from the figures, descriptions, and claims included herein.

BRIEF DESCRIPTON OF THE DRAWINGS

For a more complete understanding of the present disclosure, reference is now made to the following description, taken in conjunction with the accompanying drawings, in which.

Figure 4:
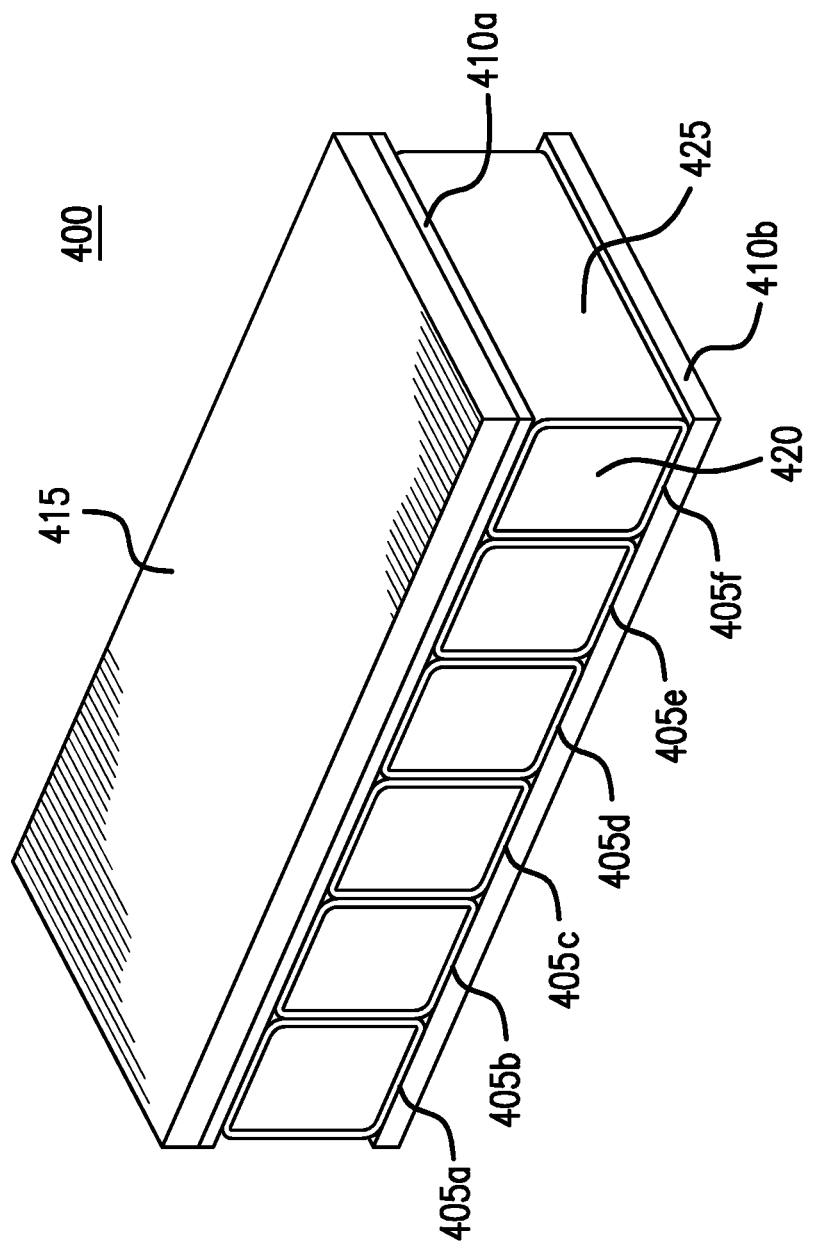
FIG. 4 illustrates an example composite insulated floor of the present disclosure.
Figure 6:
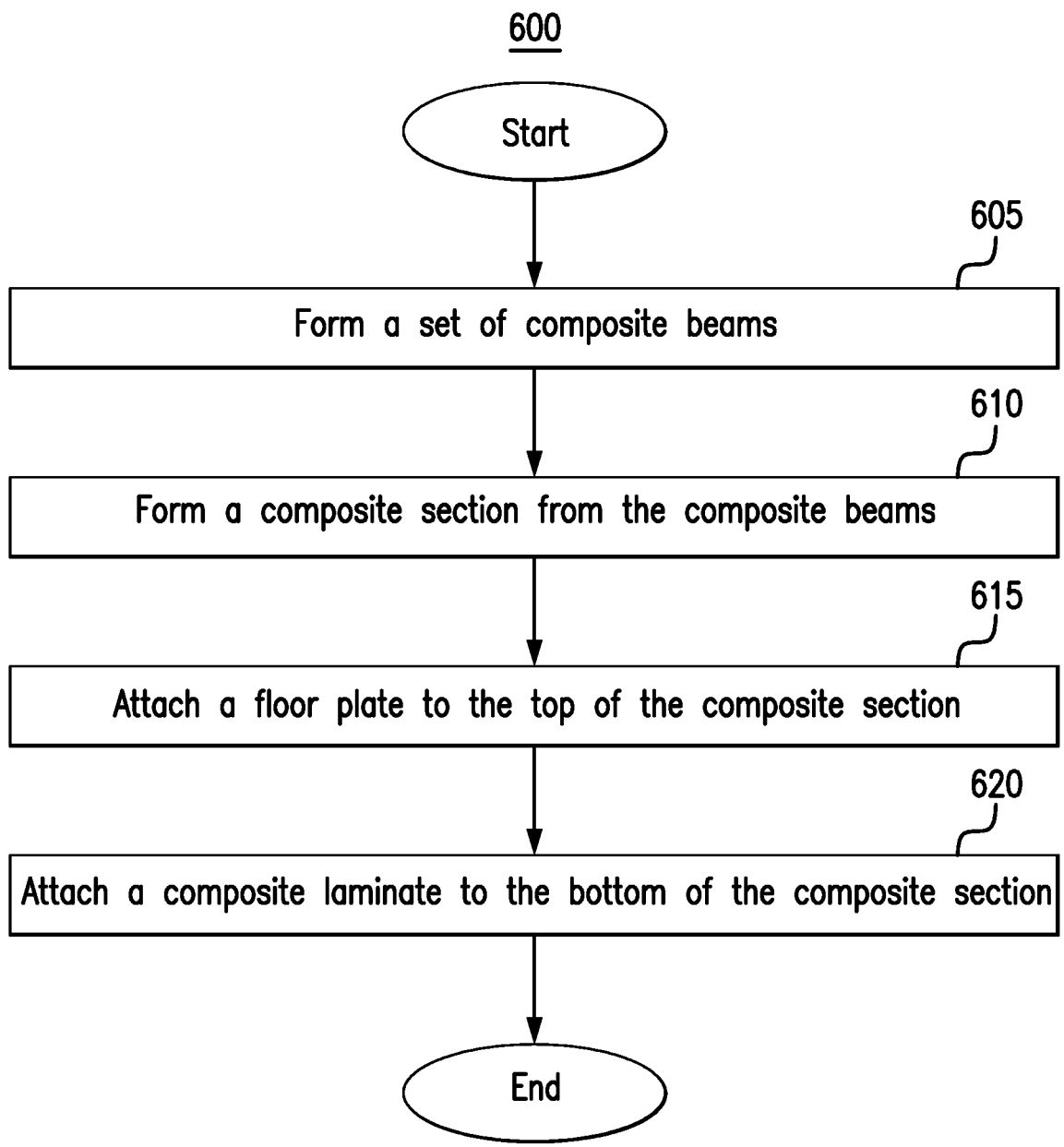
Figure 7A:
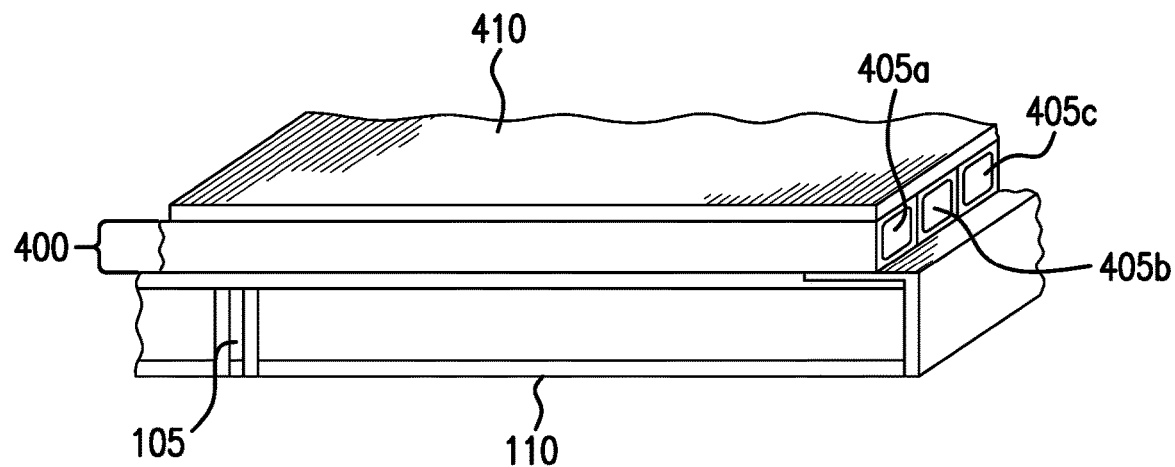
Figure 7B:
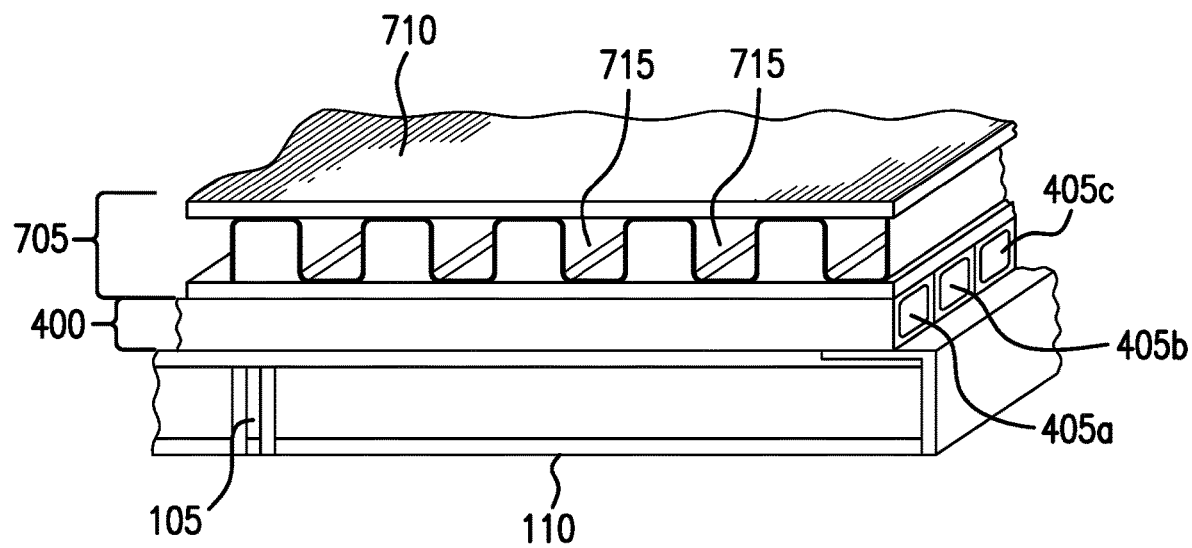
Figure 8:
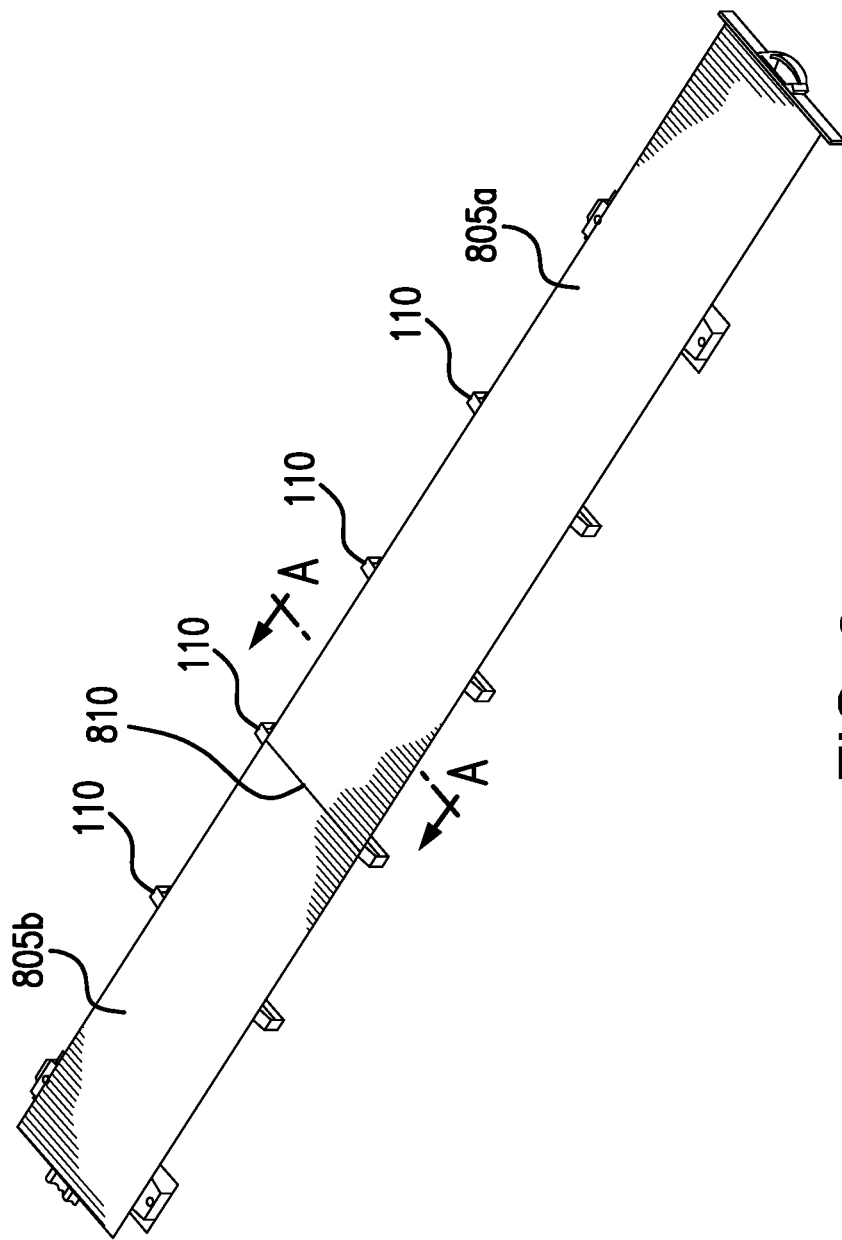
Figure 9:
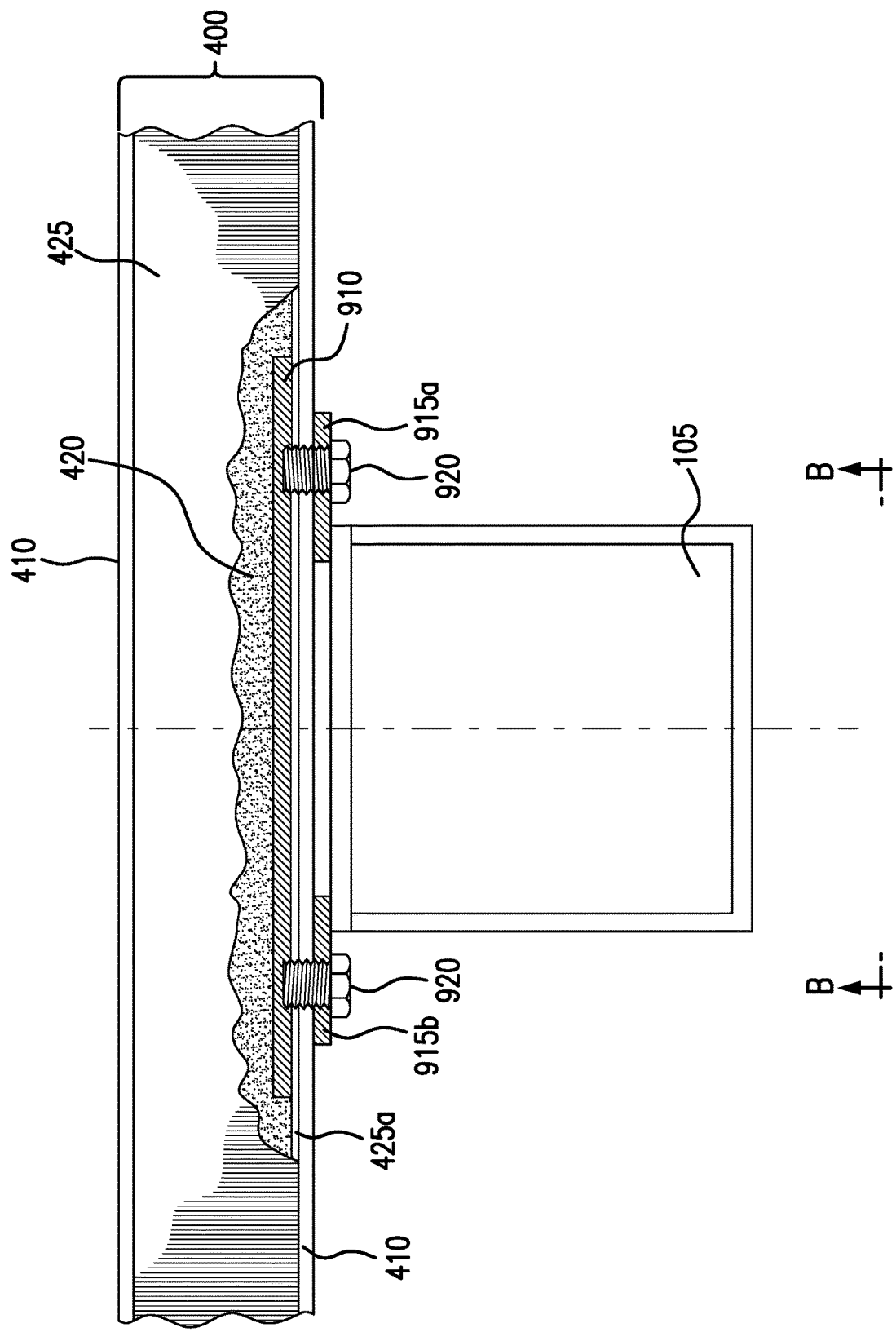
Figure 10:
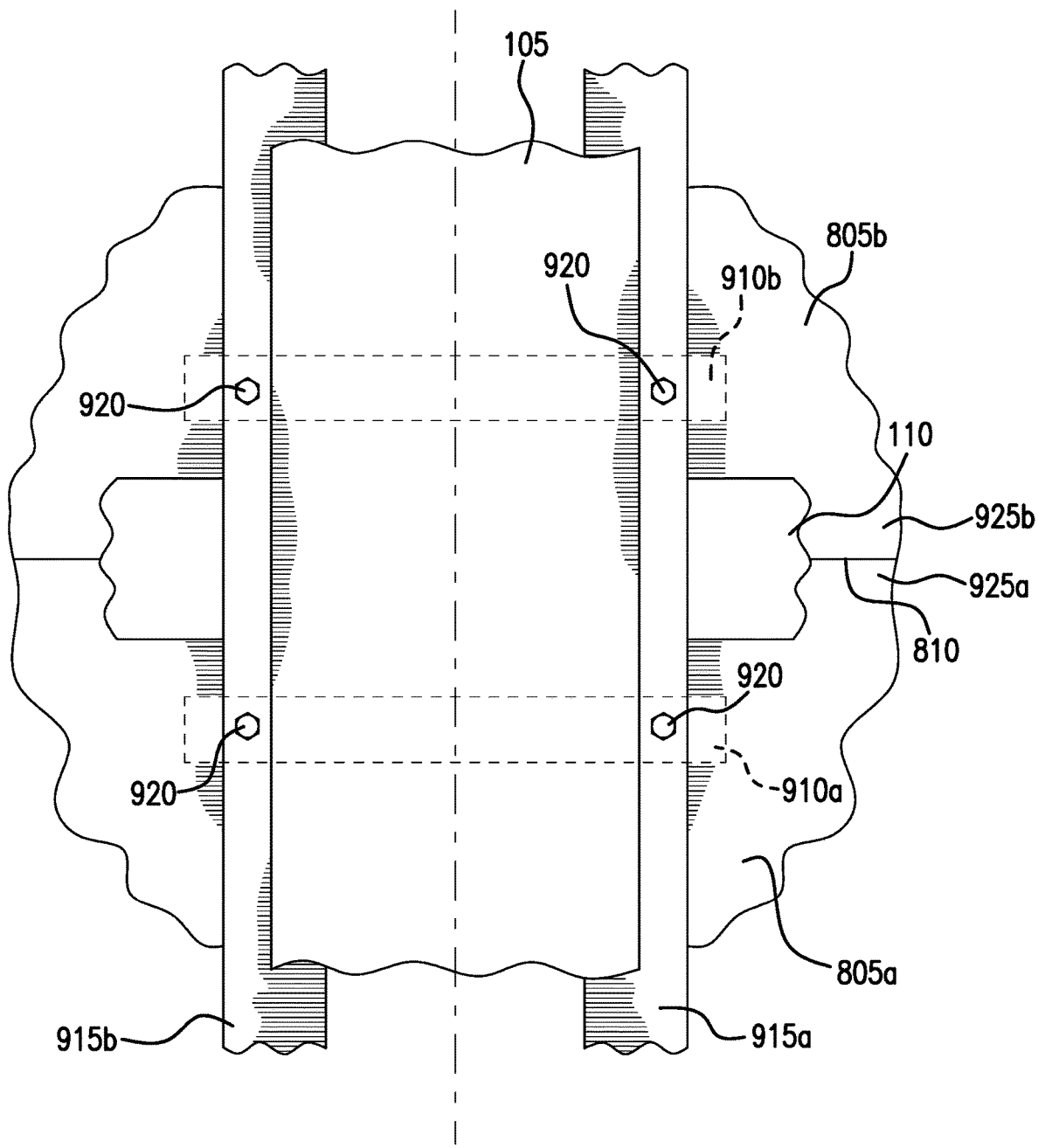
Figure 11:
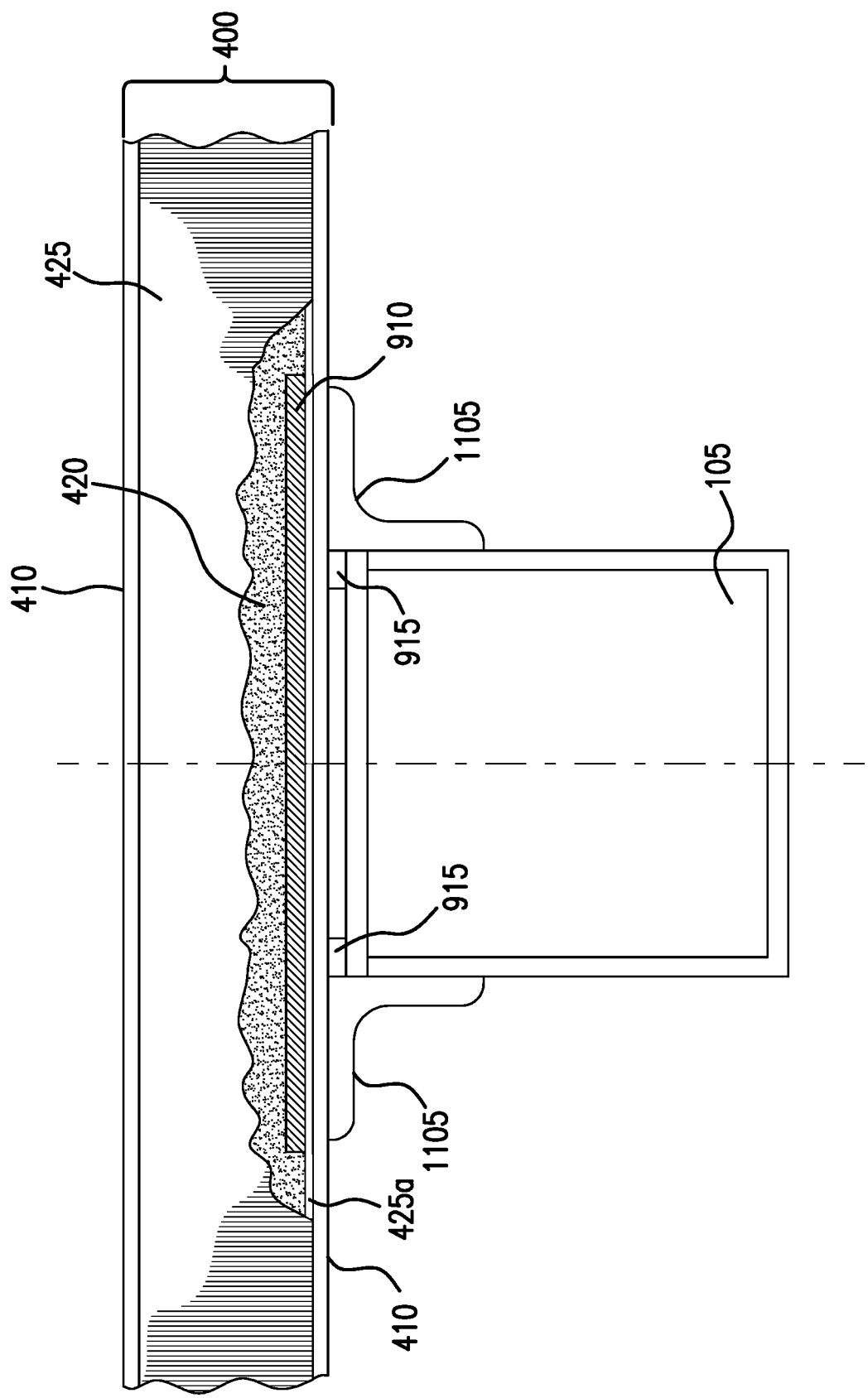
Figure 12:
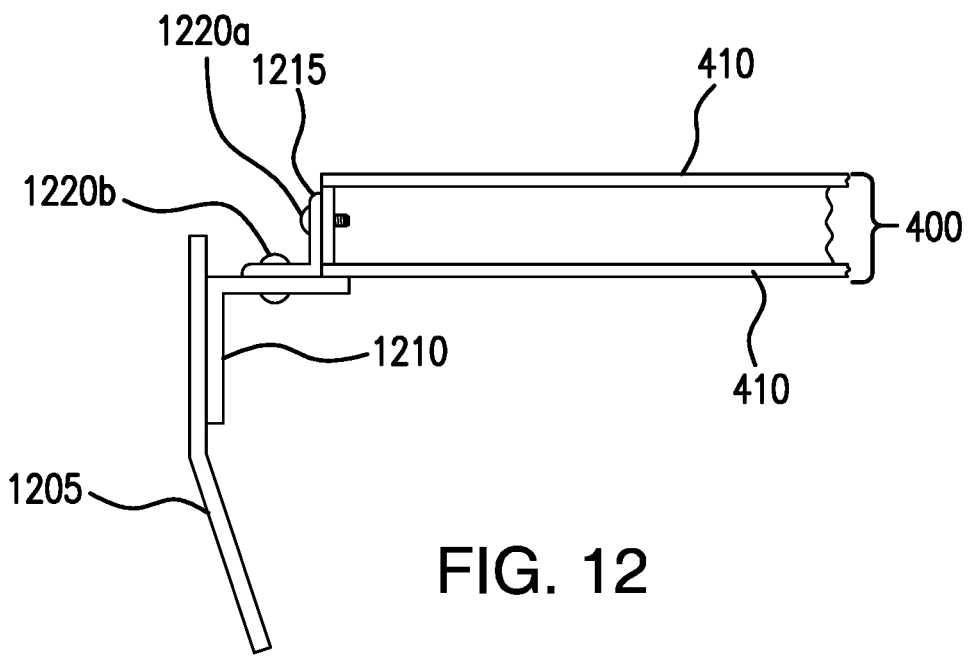
Figure 13:
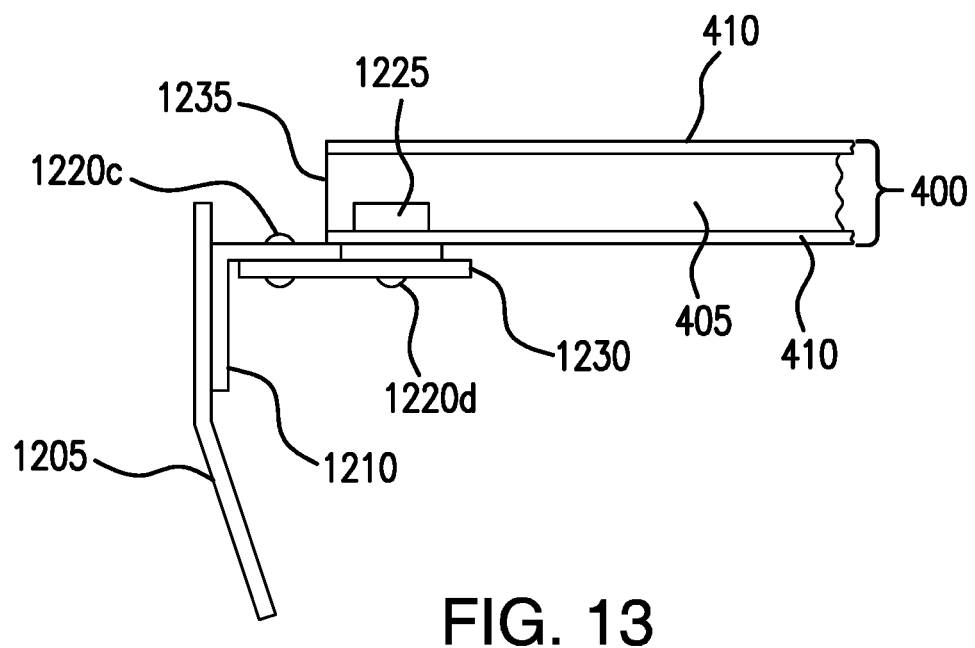
Figure 14:
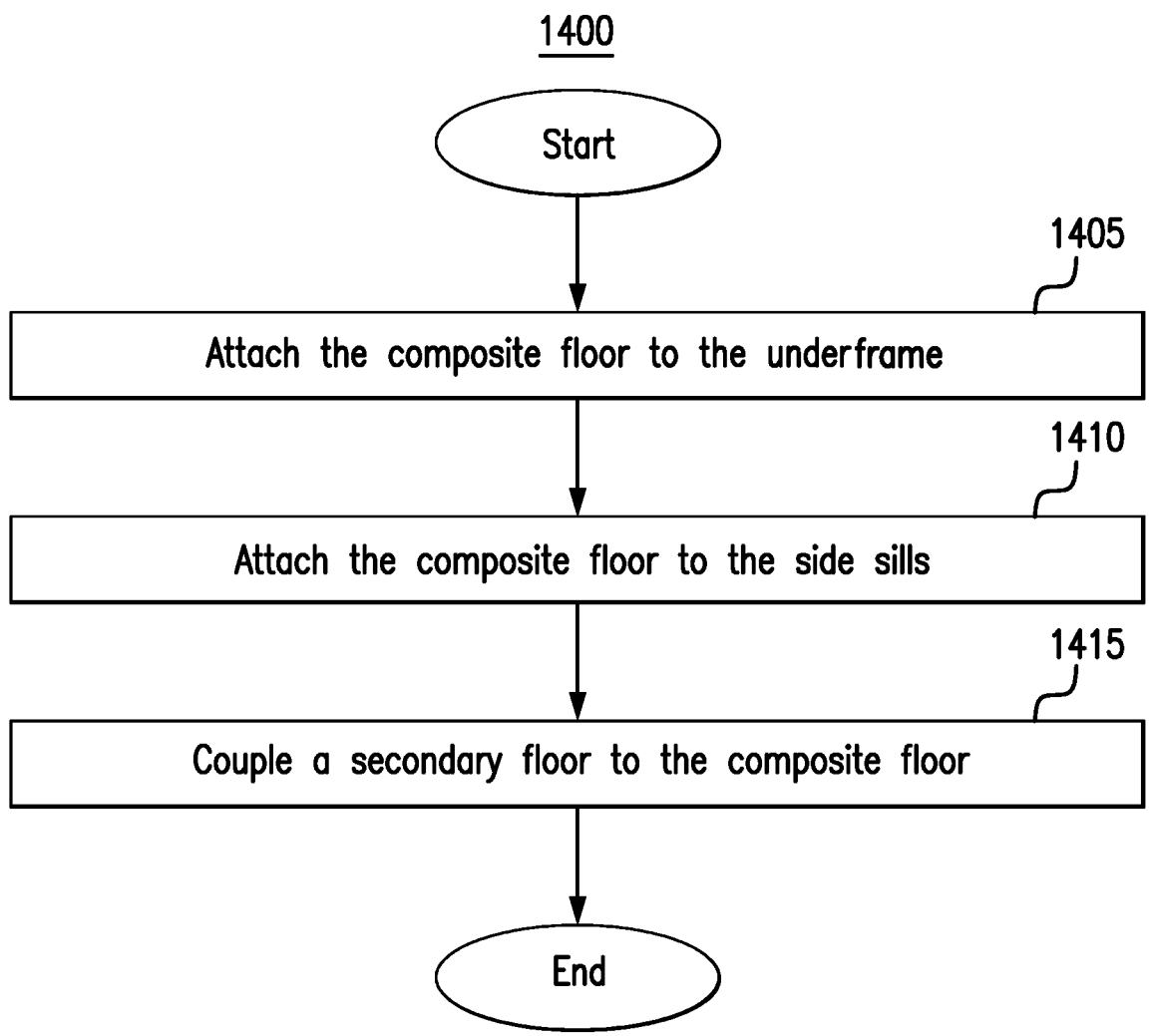

FIG. 6 presents a flowchart illustrating an example process for forming the composite insulated floor illustrated in FIG. 4;

FIG. 7A illustrates an example installation of the composite insulated floor of FIG. 4, for use in an insulated boxcar;

FIG. 7B illustrates an example installation of the composite insulated floor of FIG. 4, for use in a refrigerated boxcar;

FIG. 8 illustrates a top-down view of an example installation of the composite insulated floor of FIG. 4, in an embodiment in which the floor is comprised of two sections;

FIG. 9 illustrates a cross-section of the example installation of the composite insulated floor of FIG. 8, in which the floor is attached to the center sill of the boxcar underframe using fasteners;

FIG. 10 illustrates a bottom-up view of the example installation of the composite insulated floor of FIG. 4, illustrated in FIG. 8;

FIG. 11 illustrates a cross-section of the example installation of the composite insulated floor of FIG. 8, in which the floor is attached to the center sill of the boxcar underframe using angle brackets;

FIG. 12 illustrates an example attachment of the composite insulated floor of FIG. 4 to a side sill of a boxcar, that uses angle brackets;

FIG. 13 illustrates an example attachment of the composite insulated floor of FIG. 4 to a side sill of a boxcar, that uses angle brackets and tie plates; and FIG. 14 presents a flowchart illustrating an example process for installing the composite insulated floor of FIG. 4 in a boxcar.

DETAILED DESCRIPTION

Railway boxcars may include insulated floors to help maintain the interiors of the boxcars at desired temperatures. Insulated boxcars may be used in combination with refrigeration units, to transport perishable goods via rail, or without refrigeration units, to help protect the commodity within the railcar from large variations in temperature.

In addition to helping to control the temperature of the commodity within the boxcar, an insulated floor should also support both the weight of the commodity and the weight of the equipment, such as forklifts, that is used to load and unload the commodity into and out of the car. Accordingly, insulated boxcar floors are typically constructed of steel or aluminum and are insulated with foam and/or other insulating materials. However, not only do these floors tend to be heavy, they can also be costly to manufacture, and their insulating values may vary.

Additionally, problems may arise from connecting such composite floors to the railcar underframe. Typically, railcar underframes are constructed of steel, while composite floors are made of a combination of different materials. Because they are composed of different materials, the composite floor structure and the railcar underframe, on which the composite floor structure is attached, typically have different coefficients of thermal expansion. Given that the interior of an insulated boxcar is commonly maintained at a near constant temperature, while the exterior of the boxcar is subject to ambient temperature, a temperature differential frequently exists between the interior and the exterior of the boxcar. This temperature differential, coupled with the wide range of temperatures that the exterior of the boxcar may be subject to, the long length of the typical boxcar, and the differing coefficients of thermal expansion between the underframe and the composite floor, may lead to various portions of the boxcar expanding and contracting to different lengths. Accordingly, if the composite floor is not properly connected to the underframe at any point along the length of the boxcar, this non-uniform expansion/contraction may lead to large stresses, deflections, and/or buckling failures of structural components of the boxcar.

This disclosure contemplates an insulated boxcar floor system that addresses one or more of the above issues. The insulated boxcar floor is constructed from both composite materials and metal fabrications, to provide strong insulating qualities, while reducing the total weight of the floor as well as the cost of manufacturing the floor. The system can be made modular and reconfigurable, allowing for cargo specific optimization. In particular, the composite insulated floor system may be used not only as a floor in an insulated boxcar but also as a primary floor under a secondary floor in a refrigerated boxcar. In addition, the floor may be connected to the railcar underframe in a manner tailored to reduce the effects of thermal expansion, while nevertheless providing necessary support for the commodity being transported within the boxcar and improved structural integrity for the railcar. For example, an embodiment may reduce the stresses and deflections imposed on the structural components of a railcar as a result of differing coefficients of thermal expansion between the railcar underframe and the composite floor.

Embodiments of the present disclosure and its advantages are best understood by referring to FIGS. 1 through 14 of the drawings, like numerals being used for like and corresponding parts of the various drawings.

Figure 1:
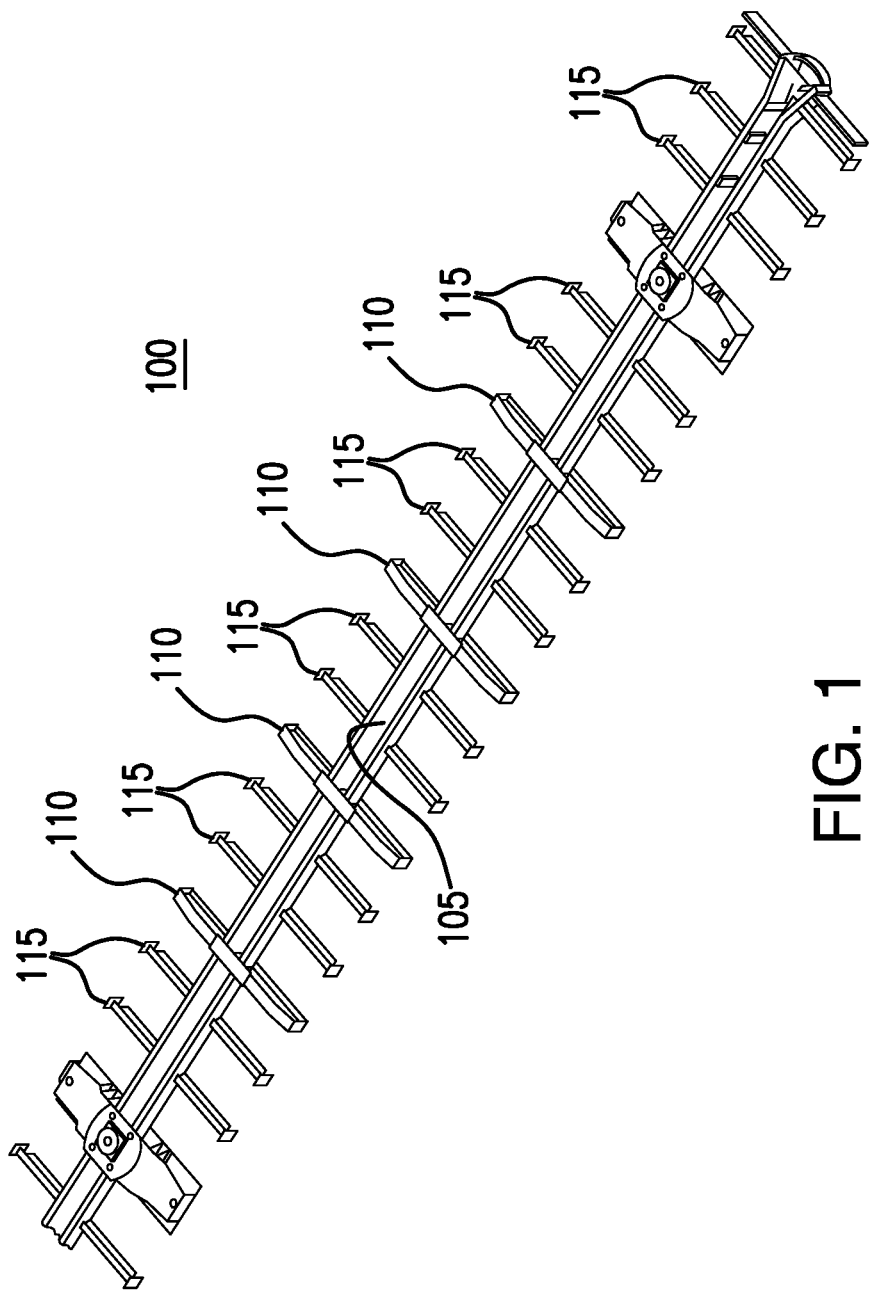
FIG. 1 illustrates an existing boxcar underframe.

Boxcar floors are typically designed to mount on top of boxcar underframes. FIG. 1 illustrates a conventional boxcar underframe 100. Conventional boxcar underframe 100 includes center sill 105, cross-bearers 110, and cross-ties 115. Cross-bearers 110 are structural members that extend laterally from center sill 105. Cross-ties 115 also extend laterally from center sill 105 and act to provide added vertical support for the boxcar floor.

Figure 2:
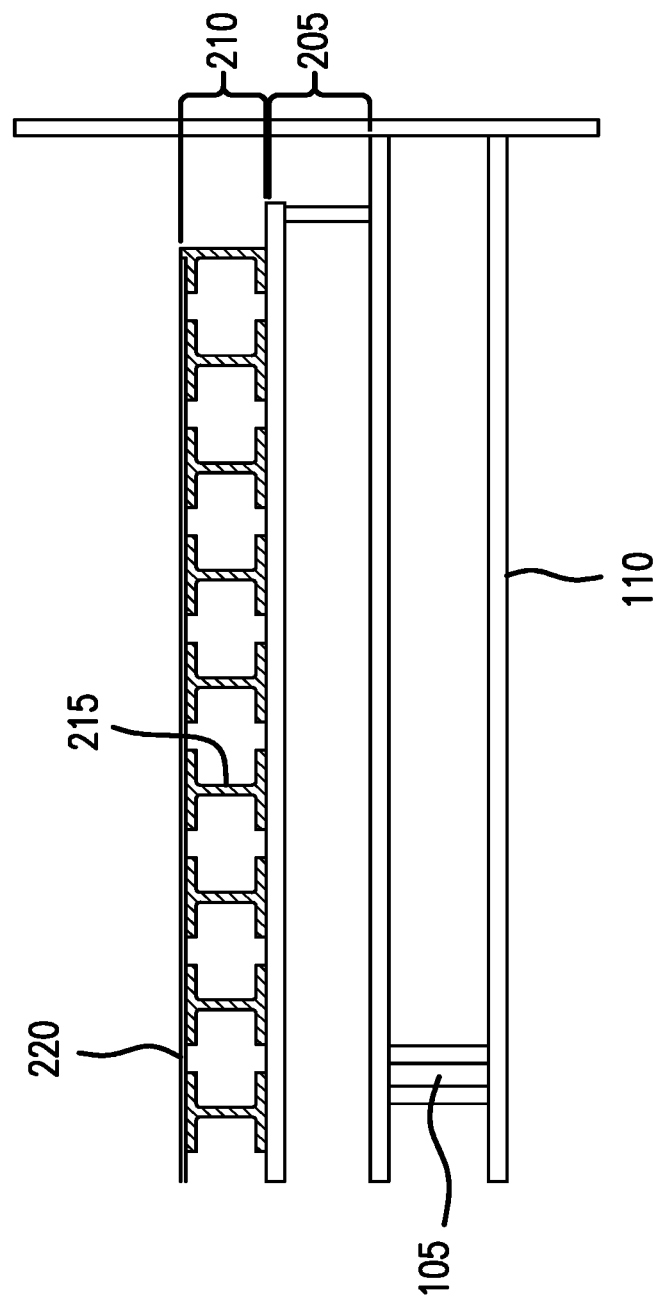
FIG. 2 illustrates a cross-section of an existing boxcar floor.

FIG. 2 illustrates a cross section of a conventional boxcar floor, for use in a refrigerated boxcar. The cross section presented in FIG. 2 is taken at a point along the length of the boxcar, and accordingly also illustrates both a cross section of center sill 105 and a length of a cross bearer 110, extending laterally from center sill 105. As illustrated in FIG. 2, the conventional boxcar floor includes a conventional primary floor assembly 205 and a conventional secondary floor assembly 210. Conventional primary floor assembly 205 may include foam or other insulating material sandwiched between a pair of flat plates (e.g., steel plates or aluminum plates), and is generally configured to withstand the loads imparted on the boxcar floor by commodity transported within the car as well as equipment, such as forklifts, used to load and unload the commodity into and out of the car. Conventional primary floor assembly 205 sits on top of and is attached to conventional boxcar underframe 100. Frequently, adhesive is used to attach conventional primary floor assembly 205 to underframe 100. Conventional secondary floor assembly 210 sits on top of primary floor assembly 205 and provides ducting for return air flow for a heating, ventilating, and air conditioning (HVAC) system located within the boxcar. For example, conventional secondary floor assembly 210 may include a set of I-beams 215 supporting a top plate 220, where the separation between the I-beams 215 is used to create the return air flow ducts for the HVAC system.

The use of conventional boxcar floors, such as the one illustrated in FIG. 2, may be associated with a number of potential disadvantages. For example, such floors tend to be heavy and costly to manufacture. Additionally, differing values of the coefficients of thermal expansion between the underframe 100 and the primary floor assembly 205 may lead to large stresses, deflections, and even buckling failures of structural components in the boxcar, if the primary floor assembly 205 is improperly connected to underframe 100. In particular, differing values of the coefficients of thermal expansion between underframe 100 and primary floor assembly 205 may lead to failures of the adhesive used to attach primary floor assembly 205 to underframe 100.

This disclosure contemplates an insulated boxcar floor system constructed of composite materials and metal fabrications, which may be used in both insulated and refrigerated boxcars. The floor system provides high quality insulation, while nevertheless offering reduced weight and cost as compared to conventional insulated boxcar floors. In particular, this disclosure contemplates that the strength offered by the floor system may be such that the underlying underframe structure of the boxcar may be lightened, reducing cost and weight.

Figure 3:
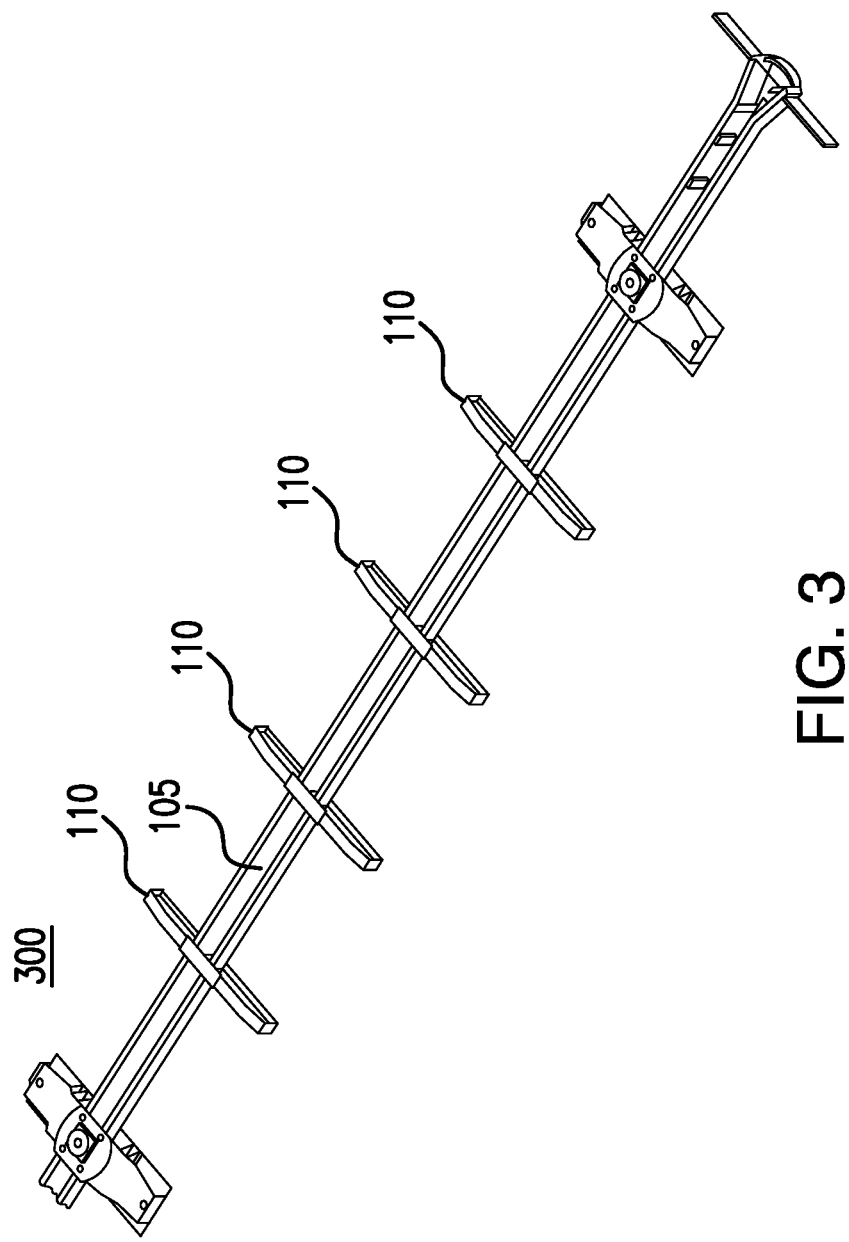
FIG. 3 illustrates a boxcar underframe for use with the composite insulated floor of the present disclosure.

FIG. 3 presents an example underframe 300 for use with the insulated boxcar floor system of the present disclosure, in certain embodiments. As illustrated in FIG. 3, underframe 300 includes center sill 105 and cross-bearers 110. In contrast to conventional underframe 100, illustrated in FIG. 1, underframe 300 does not include cross-ties 115. Cross-ties 115 may be removed from underframe 300, as they are not necessary for vertical support due to the added strength of the overlying insulated composite boxcar floor structure. In this manner, underframe 300, for use with certain embodiments of the insulated composite boxcar floor of the present disclosure, weighs less than conventional underframes 100.

FIG. 4 presents an example composite insulated floor 400 of the present disclosure. Composite insulated floor 400 may be used as part of a primary floor assembly in either an insulated boxcar or a refrigerated boxcar. As illustrated in FIG. 4, composite insulated floor 400 includes composite beams 405a through 405f, lamination layers 410a and 410b, and top plate 415. This disclosure contemplates that composite beams 405 may be transverse beams, aligned perpendicular to, and centered about the longitudinal centerline of railcar underframe 300, when composite insulated floor 400 is installed on top of underframe 300. The sidewalls of adjacent composite beams 405 may contact each other. In certain embodiments, some or all of composite beams 405 may be integrally molded together to form one composite part. The use of composite beams 405 may enable composite insulated floor 400 to meet strength and deflection requirements that are to be satisfied by composite insulated floor 400.

As illustrated in FIG. 4, the top surfaces of composite beams 405 are generally coplanar. This creates a smooth surface onto which top plate 415 may be installed. This disclosure contemplates that top plate 415 may be installed onto composite beams 405 in any suitable manner. For example, top plate 415 may be bonded to composite beams 405 using laminate layer 410a. Top plate 415 may be formed from any suitable material. For example, in certain embodiments, top plate 415 is formed from a sheet of metal. In some embodiments, a composite underlayment 410b may also be laminated to the bottom surfaces of composite beams 405.

In certain embodiments, each composite beam 405 is constructed of an outer material 425 surrounding an inner core 420. Outer material 425 may be formed from reinforcing fibers. For example, outer material 425 may be formed from fiberglass, carbon fiber members, cellulose fiber members, polymer fiber members, or combinations of these. Outer material 425 may be in the form of a fabric that is also impregnated or coated with resin. This disclosure contemplates that the fiber material may be in various forms, such as chopped, woven, or non-woven, for example. In certain embodiments, outer material 425 may be formed from multiple reinforcing layers, stacked together and used in combination. For example, a chopped fiber fabric layer may be positioned adjacent to a continuous fiber fabric layer. As another example, the fiber orientations of each fiber layer may be optimized in different directions to maximize the strength of composite insulating floor 400, and/or to control deflection in a desired fashion. As a further example, outer material 425 may be formed of layers of varying glass or carbon fibers, cellulose, or polymer materials, with or without supporting material. In some embodiments, the layers may be laminated together. The number of layers and the materials used for the layers may be varied based on both design and cost considerations. This disclosure contemplates that composite underlayment 410b may also be formed from reinforcing fibers, such that the above description for outer material 425 applies equally to the underlayment 410b.

Inner core 420 may be any suitable material capable of providing both structural support and insulating value to composite beams 405. For example, inner core 420 may be formed from foam, wood, polymer, or any other suitable material or combination of materials. In certain embodiments, inner supporting material 420 may include internal framing, or other supporting materials, to provide additional structural support. This disclosure contemplates that inner core 420 may be designed to accommodate the needs of particular applications. For example, in areas of the composite insulated boxcar floor that may need more strength and/or insulation, a high-density foam may be used in place of a lower density foam, used elsewhere within the floor.

In certain embodiments, outer material 425 and inner core 420 may be combined prior to laminating composite beams 405 together. In other embodiments, the outer material 425 of a first composite beam 405a may be laminated to the outer material 425 of a second composite beam 405b, prior to adding inner core 420 to composite beams 405. This disclosure also contemplates that in certain embodiments, outer material 425 and inner core 420 may be a composite preform, a composite pultrusion, or a combination of a composite preform and a composite pultrusion.

While illustrated in FIG. 4 as including a set of six beams 405a through 405f, this disclosure contemplates that composite insulated floor 400 may include any number of composite beams 405. Furthermore, composite insulated floor 400 may include a composite section of any form (e.g., with or without beams 405), attached to top plate 415 through a laminate layer 410. For example, in certain embodiments, composite insulated floor 400 may include a single beam. Additionally, the dimensions and/or composition of the composite section may be varied across the section, as needed, to withstand the loads and the deflections that the section may be subjected to. For example, in certain embodiments, the composition of the composite section may be varied, and/or the thickness of the composite section may be increased in areas of the composite section that are typically subjected to the greatest forces.

Figure 5A:
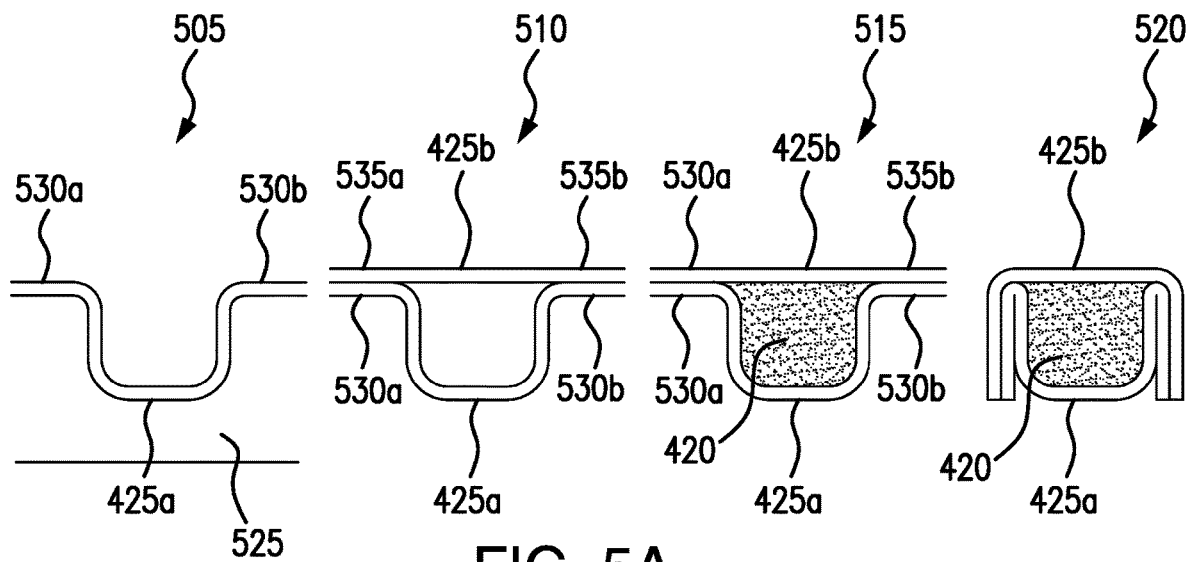
FIGS. 5A and 5B illustrate an example manufacturing technique for the composite insulated floor of FIG. 4.
Figure 5B:
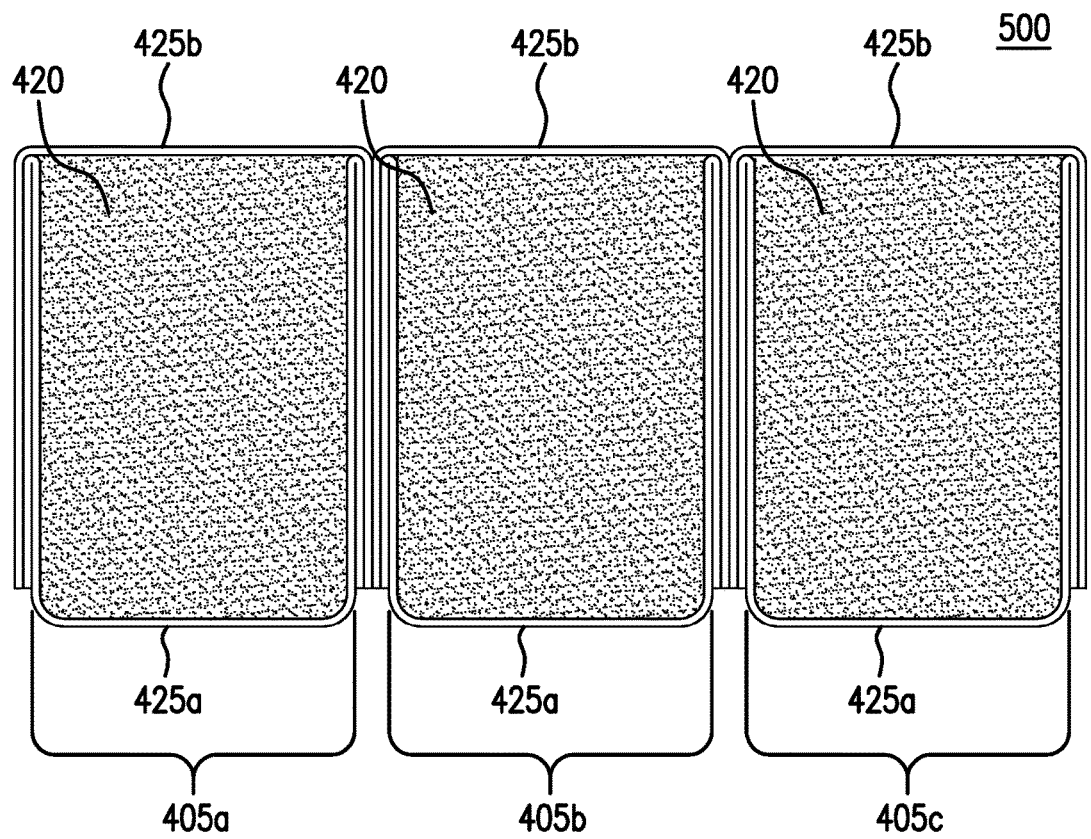

For some floor designs, the primary failure mode may be buckling of one or more of the composite beam members 405 of composite insulated floor 400, due to loads imposed from above. Accordingly, as illustrated in FIGS. 5A and 5B, in certain embodiments, the buckling strength of beam members 405 (and floor 400, overall), may be increased by adding material to the vertical sides of the individual beam members 405 before they are laminated together. FIG. 5A illustrates an example method by which a composite beam 405 may be manufactured with added material on each vertical side of the beam 405.

As illustrated in FIG. 5A, each beam 405 may be formed using mold 525. FIG. 5A illustrates a cross-section of mold 525. As a first step 505 in manufacturing beam 405, beam fabric may be placed into mold 525, to form the bottom portion 425a of outer beam material 425. Any number of fabric layers may be placed into mold 525 to form the bottom portion 425a of outer beam material 425. Here, excess fabric 530a and 530b is left remaining on either side of mold 525. Next, in step 510, additional beam fabric may be placed on top of mold 525, to form the top portion 425b of outer beam material 425. Any number of fabric layers may be placed on top of mold 525 to form the top portion 425b of outer beam material 425. Once again, excess fabric 535a and 535b is left remaining on either side of mold 525. In step 515, the area between bottom portion 425a and top portion 425b of beam 405 is filled with an insulating/supporting material such as foam, wood, polymer, or any other suitable material, to form core 420 of beam 405. While illustrated in FIG. 5A as being added to beam 405 after top portion 425b has been placed on top of mold 525, this disclosure contemplates that core 420 may be added to beam 405 at any suitable time. For example, core 420 may be added to beam 405 after bottom portion 425a of beam 405 has been formed and before top portion 425b of beam 405 has been formed. In step 520, the excess fabric 530a and 535a is folded over onto a first vertical side of beam 405, and the excess fabric 530b and 535b is folded over onto a second vertical side of beam 405. In this manner, extra fabric may be added to each vertical side of beam 405, thereby increasing the buckling strength of beam 405, in certain embodiments.

While FIG. 5A illustrates an amount of excess fabric 530*a*/535*a* and 530*b*/535*b* left remaining on either side of mold 525 that allows for a single folding of the excess fabric onto each side of beam 405, this disclosure contemplates that excess fabric 530*a*/535*a* and 530*b*/535*b* may be of any length and may be folded any number of times and in any manner around beam 405. As an example, excess fabric 530*a*/535*a* and 530*b*/535*b* may be approximately twice as long as each side of beam 405. A first portion of this excess fabric 530*a*/535*a* may be folded over onto a first vertical side of beam 405, and then the remaining excess fabric 530*a*/535*a* may be folded from the bottom of beam 405 to overlap the first portion of the excess fabric 530*a*/535*a* that was folded over onto the side of beam 405. Similarly, a first portion of excess fabric 530*b*/535*b* may be folded over onto a second vertical side of beam 405, and then the remaining excess fabric 530*b*/535*b* may be folded from the bottom of beam 405 to overlap the first portion of the excess fabric 530*b*/535*b* that was folded onto the side of beam 405. As another example, excess fabric 530*a*/535*a* and/or 530*b*/535*b* may be of a suitable length to be folded over the sides of beam 405 any number of times. As a further example, excess fabric 530*a*/535*a* and/or 530*b*/535*b* may be folded over the top of beam 405 and/or the bottom of beam 405 any number of times.

Modifications, additions, or omissions may be made to the steps illustrated in FIG. 5A. For example, the process used to manufacture composite beams 405 may include more, fewer, or other steps. For example, steps may be performed in parallel or in any suitable order. This disclosure contemplates that the steps may be performed by an individual, machine, or any suitable device.

FIG. 5B illustrates an example portion of a composite section 500 of the composite insulated floor of the present disclosure, formed from a set of beams 405 that include extra fabric added to the vertical sides of each beam. While FIG. 5B illustrates two layers of fabric folded over onto each vertical side of each beam 405, any number of layers of extra fabric may be added to the vertical sides of beams 405, as described above, in the discussion of FIG. 5A. As illustrated in FIG. 5B, composite section 500 is formed by laminating and/or molding beams 405*a* through 405*c* together. For example, composite section 500 may be formed by laminating a side of first beam 405*a* to a first side of second beam 405*b* and laminating a second side of second beam 405*b* to a first side of third beam 405*c*. As another example, composite section 500 may be formed by placing second beam 405*b* beside first beam 405*a*, placing third beam 405*c* beside second beam 405*b*, and molding first beam 405*a*, second beam 405*b*, and third beam 405*c* together. In certain embodiments, the use of composite section 500 in composite insulated floor 400 may increase the load capacity of composite insulated floor 400 by a factor of two or more, without significantly increasing the cost, weight, or labor used to manufacture the floor.

FIG. 6 presents a flowchart illustrating an example method 600 by which composite insulated floor 400, illustrated in FIG. 4, may be manufactured. In step 605 a set of composite beams 405 are formed. Each composite beam 405 includes an inner core 420 and outer material 425 surrounding inner core 420. Composite beams 405 may be manufactured in any suitable manner. For example, in certain embodiments, each composite beam 405 is formed by placing fabric layers and insulating material in a mold 525, as described above in the discussion of FIG. 5A. In certain embodiments, forming a composite beam 405 includes first forming inner core 420 and then wrapping outer material 425 around inner core 420. In some embodiments, forming a composite beam 405 includes first forming outer material 425 and then filling the shell formed by outer material 425 with inner core 420. In step 610 composite beams 405 are assembled together into a composite section 500. Composite section 500 may be formed in any suitable manner. As an example, in certain embodiments, composite section 500 may be formed by laminating beams 405 together. For example, a side of a first beam 405 may be laminated to a first side of a second beam 405, a second side of the first beam 405 may be laminated to a first side of a third beam 405, and so on, until all of the beams 405 are laminated together. As another example, in certain embodiments, some or all of composite beams 405 may be integrally molded together to form one composite part. For example, composite section 500 may be formed by placing a set of beams 405 beside one another in a mold and then molding the set of beams 405 together. In certain embodiments, beams 405 may be assembled together prior to inner core 420 being added to each beam. For example, in step 605 outer material 425 of each beam 405 may be formed, and the resulting shells of outer material 425 may be laminated together and/or integrally molded together prior to adding inner cores 420.

In step 615 a flat plate 415 is installed onto the top surfaces of composite beams 405 in composite section 500. Plate 415 is designed to act as the surface of composite floor 400. Plate 415 may be installed onto the top surfaces of composite beams 405 in any suitable manner. For example, in certain embodiments, plate 415 is installed onto the top surfaces of composite beams 405 using a laminate layer 410*a*. In step 620 a composite underlayment 410*b* is added to the bottom of composite section 500. For example, composite underlayment 410*b* may be laminated to the bottom surfaces of composite beams 405.

Modifications, additions, or omissions may be made to method 600 depicted in FIG. 6. Method 600 may include more, fewer, or other steps. For example, steps may be performed in parallel or in any suitable order.

This disclosure contemplates that composite insulated floor 400 may be used in both an insulated boxcar and a refrigerated boxcar. FIG. 7A illustrates an embodiment in which composite insulated floor 400 is used in an insulated boxcar, while FIG. 7B illustrates an embodiment in which composite insulated floor 400 is used in a refrigerated boxcar.

As illustrated in FIGS. 7A and 7B, composite insulated floor 400 is attached on top of center sill 105 and crossbearers 110, with composite beams 405*a* through 405*c* of composite insulated floor 400 running parallel to crossbearers 110. The installation of composite insulated floor 400 illustrated in FIG. 7A may be used in an insulated boxcar, which does not require any return air ducting. In such situations, commodity may be placed directed on top of top plate 410 of composite insulated floor 400. This disclosure contemplates that composite insulated floor 400 may be strong enough to support the weight of the commodity, as well as the weight of the equipment used to load and unload the commodity into and out of the boxcar.

In certain embodiments, composite insulated floor 400 may be used as a primary floor onto which a second floor 705 may be installed. For example, FIG. 7B illustrates an example embodiment in which composite insulated floor 400 is used as a primary floor in a refrigerated boxcar.

Secondary floor 705 is then installed on top of primary floor 400. As illustrated in FIG. 7B, secondary floor 705 includes top plate 710 and channels 715, which may be used to provide ducting for an HVAC system installed within the refrigerated boxcar. Commodity loaded into the refrigerated boxcar may be placed on top of top plate 710. Secondary floor 705 then transfers the loads from such commodity, as well as the loads from the equipment used to load and unload the commodity into and out of the boxcar, into primary floor 400.

This disclosure contemplates that the strength and insulating properties of primary composite floor 400 are such that the floor allows for great flexibility in the design of overlaying secondary floor 705. For example, in certain embodiments, secondary floor 705 may be reconfigurable and removable. A removable secondary floor 705 may be desirable as it allows for increased internal space, when transporting cargo that does not require refrigeration. Alternatively, secondary floor 705 may be collapsible, to increase the internal space within the boxcar. For example, in certain embodiments, the vertical uprights of ducting 715 may be collapsible.

This disclosure also contemplates that the strength of primary composite floor 400 is such that it allows for secondary floor 705 to be reconfigurable for cargo-specific needs. For example, in certain embodiments, rotatable gate elements may be added to secondary floor 705 to redirect cooling air from an HVAC system. The rotatable gate elements may be manually or automatically operated to create temperature zones within a given boxcar. Dynamic operation of these gates may, in particular, provide a new degree of temperature control within a refrigerated boxcar.

As described above, one of the challenges in designing a composite insulating floor for use in a boxcar arises from the need to attach the composite floor to the metal underframe of the boxcar. When commodity is loaded onto the floor of a boxcar, it may be subjected to lateral and longitudinal accelerations and decelerations during transport. The commodity transmits a force into the floor through friction, due to its weight on the floor multiplied by the acceleration experienced. Accordingly, the floor should be attached to the boxcar underframe, such that the force in the floor may be transferred into the boxcar underframe. In addition, thermal expansion, which may lead to length changes between the floor and the underframe, should be taken into account in determining an attachment mechanism between the floor and the underframe.

If primary floor 400 has commodity loaded directly onto it, one method for transferring longitudinal loads from the commodity into the underframe is through longitudinal shear connections. With underframe 100 or underframe 300, this load may be transferred into one or any number of underframe components or combination of components. For example, the load may be transferred into center sill 105, cross-bearers 110, cross-ties 115, the side sill of the boxcar, and/or any other suitable component or combination of components. The load may also be transferred into the end structure of the railcar.

In certain embodiments, primary floor structure 400 may be attached to underframe 100 or underframe 300 using adhesives. In some embodiments, primary floor structure 400 may be attached to underframe 100 or underframe 300 using a combination of adhesives and mechanical connections. In certain embodiments in which the floor is designed to be rapidly reconfigurable and/or removable, gaskets and mechanical connections may be used to attach primary floor structure 400 to underframe 100 or underframe 300.

In certain embodiments, composite insulated floor 400 may include more than one separate piece (e.g., two or more separate pieces). For example, as illustrated in FIG. 8, composite insulated floor 400 may be constructed of two separate pieces—first piece 805a and second piece 805b—that are joined together upon assembly onto underframe 300. In some embodiments, first piece 805a and second piece 805b may be connected together over a cross-bearer 110, to provide structural support to the floor at joint 810. In such embodiments, each of first piece 805a and second piece 805b of floor 400 may be connected to underframe 300 near joint 810. This may minimize the thermal expansion stresses on joint 810, due to the close proximity between the connection points, while at the same time distributing the floor longitudinal shear forces across multiple connections, to lower the stresses in these concentrated areas. This permits the shear connections to be solid attachments rather than attachments that allow for some longitudinal motion to accommodate for thermal expansion. Solid attachments may be desirable as they may prevent floor 400 from shifting longitudinally due to longitudinal railcar acceleration and deceleration forces. They also provide additional vertical connections between primary floor 400 and underframe 300, in addition to the use of adhesive. While FIG. 8 illustrates composite insulated floor 400 as being constructed of two separate pieces, this disclosure contemplates that floor 400 may include any number of one or more separate pieces.

FIGS. 9 and 10 illustrate a cross-section and a bottom-up view, respectively, of composite insulated floor 400, when attached to center sill 105 of underframe 300, in certain embodiments. The illustrated cross-section of FIG. 9 is viewed from the line labeled A-A in FIG. 8, while the bottom-up view of FIG. 10 is viewed from the line labeled B-B in FIG. 9.

As illustrated in FIGS. 9 and 10, a pair of support pads, 915a and 915b may sit on top of center sill 105 and run longitudinally along each side of center sill 105, with a first portion of each support pad 915a/b contacting the top of center sill 105, and a second portion of each support pad 915a/b extending laterally beyond center sill 105. This disclosure contemplates that support pads 915a/b may be coupled to center sill 105 in any suitable manner. For example, in certain embodiments, support pads 915a/b are welded to center sill 105.

Composite insulated floor 400 is configured to rest on top of support pads 915a and 915b, and to attach to underframe 300 through support pads 915a and 915b. In order to attach composite insulated floor 400 to support pads 915a/b, in certain embodiments, composite insulated floor 400 includes one or more beam plates 910, embedded within composite floor 400 and rigidly connected to one or more beams 405. For example, in certain embodiments, one or more beam plates may be located within inner core 420. In embodiments in which composite insulated floor 400 is constructed from separate pieces 805a and 805b (as illustrated in FIG. 8), a beam plate 910 may be embedded within each piece 805a/b and coupled to one or more beams 405 near an end of the piece 805a/b, such that beam plate 910 is located near floor joint 810, when piece 805a/b is installed on top of underframe 300. For example, as illustrated in FIG. 10, beam plate 910a is located near end 925a of first piece 805a and beam plate 910b is located near end 925b of second piece 805b. In this manner, both first piece 805a and second piece 805b of floor 400 may be connected to underframe 300, through support pads 915a and 915b, near joint 810. In certain embodiments, mechanical fasteners 920 may then be used to connect the composite floor beam plate 910 to support pads 915a and 915b. This disclosure contemplates that any suitable type or combination of types of mechanical fasteners may be used to connect beam plate 910 to support pads 915a and 915b. For example, bolts and/or pins may be used as mechanical fasteners 920. The use of mechanical fasteners 920 to connect composite floor beam plate 910 to support pads 915a/b generates a clamping force on fabric 425a and/or fabric 410 located between beam plate 910 and each support pad 915a/b. In certain embodiments, this clamping force transfers shear load from floor 400 into center sill 105.

As illustrated in FIG. 11, in some embodiments, rather than or in addition to connecting composite insulated floor 400 to support pads 915a/b using mechanical fasteners 920, composite insulated floor 400 may by attached to underframe 300 using angles 1105 between beam plate 910 and center sill 105. In such embodiments, composite insulated floor 400 may continue to rest on support pads 915a/b. However, instead of extending laterally beyond center sill 105, support pads 915a/b may terminate at the outer lateral edges of center sill 105. This allows for angles 1105 to rest against both center sill 105 and beam plate 910, where the bottom surface of beam plate 910 may be exposed or embedded within composite floor 400 (e.g., covered by fabric layer 410). This disclosure contemplates that angles 1105 may be attached to center sill 105 and beam plate 910 in any suitable manner. For example, angles 1105 may be welded to center sill 105 and/or beam plate 910. As another example, angles 1105 may be attached to center sill 105 and/or beam plate 910 using adhesive, mechanical fasteners, or any other suitable method. As a further example, angles 1105 may be attached to center sill 105 and/or beam plate 910 using a combination of the above-described methods.

FIGS. 9 through 11 illustrate two different techniques for attaching composite insulated floor 400 to underframe 300. However, this disclosure contemplates that composite insulated floor 400 may be attached to underframe 300 in any suitable manner that provides both a longitudinal and vertical connection.

As described above, in the discussion of FIG. 3, this disclosure contemplates that the strength offered by composite insulated floor 400 may be such that the underlying underframe structure of the boxcar may be lightened, reducing cost and weight. For example, the cross-ties 115, normally present in underframes 100, may be eliminated. However, in addition to providing support for conventional boxcar floors, cross-ties 115 also add support to the side sills of the railcar, to reduce potential buckling. Eliminating the cross-ties increases the unsupported length of each side sill and may decrease the critical buckling load of the side sill. Accordingly, to address this potential issue, this disclosure contemplates that some of the beams 405 of composite insulated floor 400 may be attached to each side sill, thereby restoring the support of the side sill. The number of attachments between primary floor 400 and each side sill may be varied, as required, to achieve the desired structural support.

FIGS. 12 and 13 present two examples of attaching primary floor 400 to side sill 1205. For example, FIG. 12 illustrates the use of a first angle 1210 and a second angle 1215 to attach primary floor 400 to side sill 1205. As illustrated in FIG. 12, a first side of first angle 1210 is attached to side sill 1205, and a first side of second angle 1215 is attached to beam 405 of floor 400. This disclosure contemplates that first angle 1210 may be attached to side sill 1205 in any suitable manner. For example, in certain embodiments, first angle 1210 is welded to side sill 1205. Second angle 1215 may also be attached to beam 405 in any suitable manner. For example, in certain embodiments, second angle 1215 is attached to beam 405 using one or more mechanical fasteners 1220a. The second side of first angle 1210 may then be attached to the second side of second angle 1215, to attach primary floor 400 to side sill 1205. The second side of first angle 1210 may be attached to the second side of second angle 1215 in any suitable manner. For example, in certain embodiments, the second side of first angle 1210 may be attached to the second side of second angle 1215 using one or more mechanical fasteners 1220b.

FIG. 13 presents another example of attaching primary floor 400 to side sill 1205. The example presented in FIG. 13 uses an angle 1210 along with a plate 1225, partially embedded and rigidly attached to beam 405, to attach primary floor 400 to side sill 1205. As illustrated in FIG. 13, a first side of angle 1210 is attached to side sill 1205. This disclosure contemplates that first angle 1210 may be attached to side sill 1205 in any suitable manner. For example, in certain embodiments, first angle 1210 is welded to side sill 1205. As illustrated in FIG. 13, plate 1225 is embedded within beam 405 near edge 1235 of beam 405. In some embodiments, fabric of underlayment 410 covers the lower surface of plate 1225. In some embodiments, the exterior surface of plate 1225 is exposed. Plate 1225 may be embedded within beam 405 such that when the portion of beam 405 beyond plate 1225 is resting on the second side of angle 1210, the exterior surface of plate 1225 (or the portion of fabric 410 that is covering the lower surface of plate 1225) is flush with the second side of angle 1210. In this manner, tie plate 1230 may be installed across plate 1225 and the second side of angle 1210, to couple floor 400 to side sill 1205. This disclosure contemplates that tie plate 1230 may be attached to plate 1225 and angle 1210 in any suitable manner. For example, in certain embodiments, tie plate 1230 may be attached to plate 1225 and angle 1210 using mechanical fasteners 1220c and 1220d. Attaching floor 400 to side sill 1205, in the manner illustrated in FIG. 13 may be desirable as it may provide better insulation from exterior temperatures to the inside of the boxcar than other attachment mechanisms.

FIGS. 12 and 13 illustrate two different techniques for attaching composite insulated floor 400 to side sills 1205. However, this disclosure contemplates that composite insulated floor 400 may be attached to side sills 1205 in any suitable manner. For example, in certain embodiments, rather than mechanically fastening floor 400 to angles 1210, floor 400 may be configured to rest on top of the ledges created by the sides of angles 1210 that extend from each side sill 1205 in a direction toward center sill 105.

FIG. 14 presents a flowchart (described in conjunction with elements of FIGS. 9 through 13) illustrating an example method 1400 for installing composite insulated floor 400 into a boxcar that includes underframe 300 and side sills 1205. In step 1405 composite insulated floor 400 is coupled to underframe 300. Composite insulated floor 400 may be coupled to underframe 300 in any suitable manner. For example, in certain embodiments, composite insulated floor 400 is coupled to center sill 105 of underframe 300. This coupling may be accomplished in any suitable manner. For example, in certain embodiments, underframe 300 includes support pads 915a and 915b, which are coupled to center sill 105. For example, support pads 915a/b may be welded to center sill 105. As illustrated in FIGS. 9 and 10, each support pad 915a/b sits on top of center sill 105 and runs longitudinally along each side of center sill 105. In certain embodiments, a first portion of each support pad 915a/b contacts the top of center sill 105, while a second portion of each support pad 915a/b extends laterally beyond center sill 105. In some embodiments, instead of extending laterally beyond center sill 105, support pads 915a/b terminate at the outer lateral edges of center sill 105. As a first example of coupling insulated floor 400 to center sill 105, in certain embodiments in which a second portion of each support pad 915a/b extends laterally beyond center sill 105, composite insulated floor 400 may be coupled to center sill 105 by resting the floor 400 on top of support pads 915a and 915b, and mechanically fastening the floor to the support pads through the second portion of each support pad that extends beyond center sill 105. For example, in certain embodiments, bolts 920 may be used to couple support pads 915a/b to a beam plate 910 embedded within composite insulated floor 400. As another example of coupling insulated floor 400 to center sill 105, in certain embodiments in which support pads 915a/b terminate at the outer lateral edges of center sill 105, composite insulated floor 400 may be coupled to center sill 105 by resting the floor 400 on top of support pads 915a and 915b, and using angles 1105 to attach composite insulated floor 400 to center sill 105. Angles 1105 may be coupled to composite insulated floor 400 and to center sill 105 in any suitable manner. For example, angles 1105 may be welded to center sill 105 and mechanically fastened to a beam plate 910 embedded within composite insulated floor 400.

In step 1410, composite insulated floor 400 is coupled to side sills 1205. Composite insulated floor 400 may be coupled to side sills 1205 in any suitable manner. For example, in certain embodiments, composite insulated floor 400 is coupled to side sills 1205 by resting the floor on one or more ledges formed by angles 1210 (or any other suitable component forming a ledge on which floor 400 may rest). For instance, each angle 1210 may be coupled to a side sills 1205 along a first side of the angle 1210, and the second side of the angle 1210 may act as a ledge on which floor 400 may rest. In some embodiments, composite insulated floor 400 is mechanically coupled to angles 1210. As an example, in certain embodiments, one or more second angles 1215 are attached to beams 405 of floor 400 along a first side. The second side of each second angle 1215 may then be mechanically coupled to the second side of an angle 1210, as described above, in the discussion of FIG. 12. As another example, in certain embodiments, composite insulated floor 400 includes one or more plates 1225 embedded within the composite section 500. Each plate 1225 may then be mechanically coupled to the second side of an angle 1210 (for example, by using a tie plate 1230 as described above, in the discussion of FIG. 13).

In certain embodiments in which composite insulated floor 400 is installed in a boxcar which is designed to function as a refrigerated boxcar, method 1400 may additionally include step 1415. In step 1415 a secondary floor 705 (for example, as illustrated in FIG. 7B) is installed on top of composite insulated boxcar floor 400. Secondary floor 705 includes top plate 710 and channels 715, which may be used to provide ducting for an HVAC system installed within the refrigerated boxcar. Secondary floor 705 may be installed on top of composite insulated floor 400 in any suitable manner. As an example, in certain embodiments, secondary floor 705 may be attached to composite insulated floor 400 using adhesive. As another example, in certain embodiments, secondary floor 705 may be removably fastened to composite insulated floor 400, such that secondary floor 705 may be removed from the boxcar when transporting cargo that does not require refrigeration.

Modifications, additions, or omissions may be made to method 1400 depicted in FIG. 14. Method 1400 may include more, fewer, or other steps. For example, steps may be performed in parallel or in any suitable order.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

What is claimed is:

1. A floor section for an insulated railcar, the floor section comprising:
    a flat plate; and
    a composite section coupled to the flat plate, the composite section comprising a plurality of composite beams aligned parallel to one another, each composite beam of the plurality of composite beams comprising:
        an inner core comprising an insulating material; and
        an outer material surrounding the inner core, wherein:
            the inner core is configured to support the outer material;
            an upper surface of each composite beam of the plurality of composite beams is coupled to an underside of the flat plate, the upper surface extending along a length of the composite beam;
            each composite beam of the plurality of composite beams comprises a pair of side walls, each side wall of the pair of side walls generally perpendicular to the upper surface of the composite beam; and
            a first composite beam of the plurality of composite beams is laminated to a second composite beam of the plurality of composite beams along a side wall of the first composite beam and a side wall of the second composite beam.

2. The floor section of claim 1 wherein the outer material comprises at least one of:
    fiberglass;
    carbon fiber members;
    polymer fiber members;
    cellulose;
    resin impregnated fabric;
    a composite preform;
    a pultruded composite; and
    a first layer of fabric and a second layer of fabric, wherein a fiber orientation of the first layer of fabric is different from a fiber orientation of the second layer of fabric.

3. The floor section of claim 1, wherein the inner core comprises at least one of foam, wood, polymer, a composite preform, and a pultruded composite.

4. The floor section of claim 1, further comprising a composite underlayment, wherein:
    the flat plate is laminated to a top side of the composite section and the composite underlayment is laminated to a bottom side of the composite section, the bottom side opposite the top side; and
    the composite underlayment comprises at least one of:
        fiberglass;
        carbon fiber members;
        polymer fiber members;
        cellulose;
        resin impregnated fabric; and
        a first layer of fabric and a second layer of fabric, wherein a fiber orientation of the first layer of fabric is different from a fiber orientation of the second layer of fabric.

5. The floor section of claim 1, further comprising a beam plate embedded within the composite section, wherein the beam plate is configured to couple to at least one of an underframe of the insulated railcar and a side sill of the insulated railcar.

6. The insulated railcar of claim 1, further comprising a side sill, wherein at least one beam of the plurality of composite beams is coupled to the side sill.

7. An insulated railcar comprising:
a primary floor section comprising:
  a flat plate; and
  a composite section coupled to the flat plate, the composite section comprising a plurality of composite beams, each composite beam of the plurality of composite beams comprising:
    an inner core comprising an insulating material; and
    an outer material surrounding the inner core, wherein:
      the inner core is configured to support the outer material; and
      an upper surface of each composite beam of the plurality of composite beams is coupled to an underside of the flat plate, the upper surface extending along a length of the composite beam;
an underframe comprising:
  a center sill; and
  a plurality of cross-bearers, wherein:
    the primary floor section is coupled to the underframe;
    each composite beam of the plurality of composite beams is aligned generally parallel to each cross-bearer of the plurality of cross-bearers;
    each composite beam of the plurality of composite beams comprises a pair of side walls, each side wall of the pair of side walls generally perpendicular to the upper surface of the composite beam; and
    a first composite beam of the plurality of composite beams is laminated to a second composite beam of the plurality of composite beams along a side wall of the first composite beam and a side wall of the second composite beam.

8. The insulated railcar of claim 7, wherein the outer material comprises at least one of:
fiberglass;
carbon fiber members;
polymer fiber members;
cellulose;
resin impregnated fabric;
a composite preform;
a pultruded composite; and
a first layer of fabric and a second layer of fabric, wherein a fiber orientation of the first layer of fabric is different from a fiber orientation of the second layer of fabric.

9. The insulated railcar of claim 7, wherein the inner core comprises at least one of foam, wood, polymer, a composite preform, and a pultruded composite.

10. The insulated railcar of claim 7, wherein:
the composite section further comprises a composite underlayment;
the flat plate is laminated to a top side of the composite section and the composite underlayment is laminated to a bottom side of the composite section, the bottom side opposite the top side; and
the composite underlayment comprises at least one of:
fiberglass;
carbon fiber members;
polymer fiber members;
cellulose;
resin impregnated fabric; and
a first layer of fabric and a second layer of fabric, wherein a fiber orientation of the first layer of fabric is different from a fiber orientation of the second layer of fabric.

11. The insulated railcar of claim 7, wherein:
the primary floor section further comprises a beam plate embedded within the composite section; and
the beam plate is coupled to the underframe of the insulated railcar.

12. The insulated railcar of claim 11, wherein:
the underframe further comprises one or more support pads coupled to the center sill of the underframe; and
the beam plate is coupled to the one or more support pads.

13. The insulated railcar of claim 11, wherein the beam plate is coupled to the underframe using an angle coupled to both the beam plate and to the center sill.

14. The insulated railcar of claim 7, further comprising a secondary floor section coupled to the primary floor section, the secondary floor section comprising:
a top plate; and
a plurality of channels, the secondary floor section configured to decouple from the primary floor section.

* * * * *